Sept. 29, 1959 M. TRAITE 2,906,980
VARIABLE RESISTANCE PRESSURE GAUGE
Filed Dec. 11, 1957 2 Sheets-Sheet 1
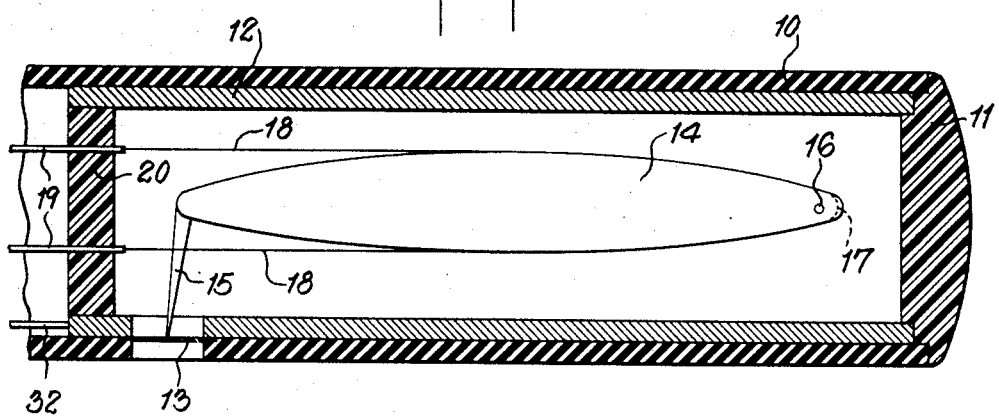
Fig.1.
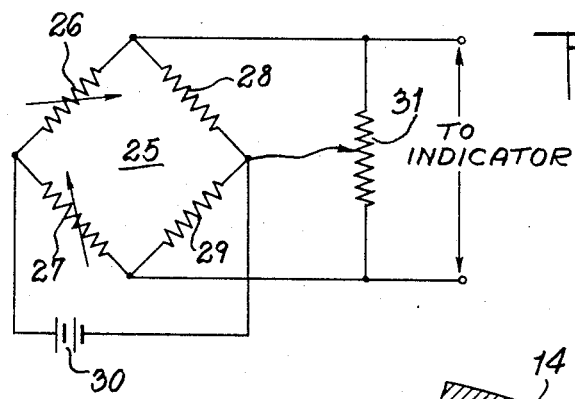
Fig.2.
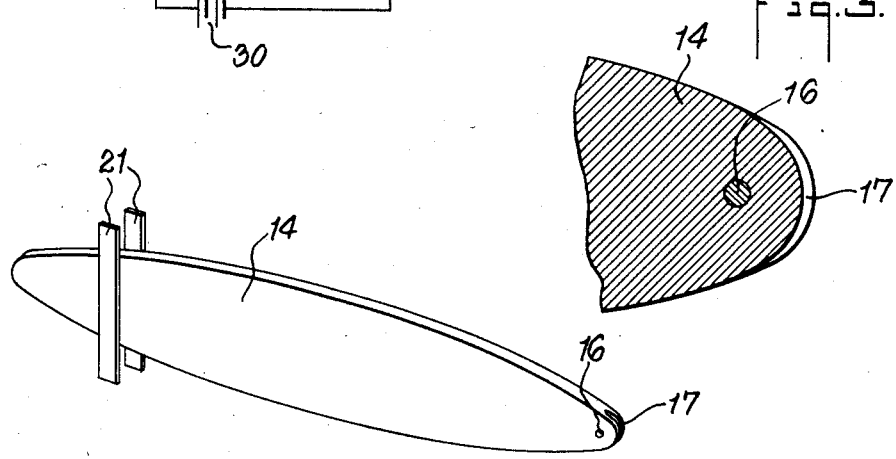
Fig.3.
Fig.4.
INVENTOR.
MAX TRAITE
BY
Cyrus D. Samuelson
ATTORNEY Sept. 29, 1959    M. TRAITE    2,906,980
VARIABLE RESISTANCE PRESSURE GAUGE
Filed Dec. 11, 1957    2 Sheets-Sheet 2

INVENTOR.
MAX TRAITE
BY Cyrus D. Samuelson
ATTORNEY

United States Patent Office 2,906,980
Patented Sept. 29, 1959

2,906,980

VARIABLE RESISTANCE PRESSURE GAUGE

Max Traite, North Brunswick, N.J., assignor to Gulton Industries, Inc., Metuchen, N.J., a corporation of New Jersey Application December 11, 1957, Serial No. 702,043

7 Claims. (Cl. 338—4)

My invention relates to variable resistance pressure gauges and in particular to those gauges which may be used to measure small pressure changes in the blood stream and which may be contained in a flexible catheter.

Up to now, strain gauges and similar devices have been employed in the measurement of pressures in the blood stream. These devices have all possessed the same inherent disadvantage, namely, they have been complex in design and difficult to construct small enough to fit conveniently inside a catheter. As a consequence, medical research, diagnosis and prognosis has been limited by the lack of good, simple, accurate, blood stream pressure measuring devices.

At present, most pressure gauges used in catheters employ a long liquid column in the catheter. At one end, the liquid column is contiguous with the blood and at the other end it is contiguous with the gauge. Since, among other things, it is difficult to remove all the air bubbles from the liquid column, these systems possess serious disadvantages.

Accordingly, it is a principal object of my invention to provide a variable resistance pressure gauge which may be contained in a catheter and which does not require a liquid column to be contained therein.

It is a further object of my invention to provide such a gauge with high sensitivity.

It is a still further object of my invention to provide such a gauge which is economical and simple to construct.

Figure 5:
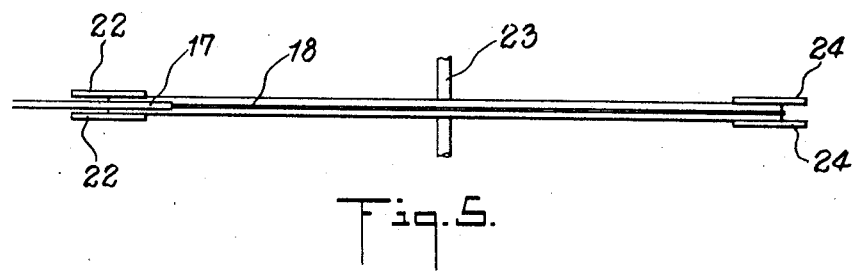
Figure 6:
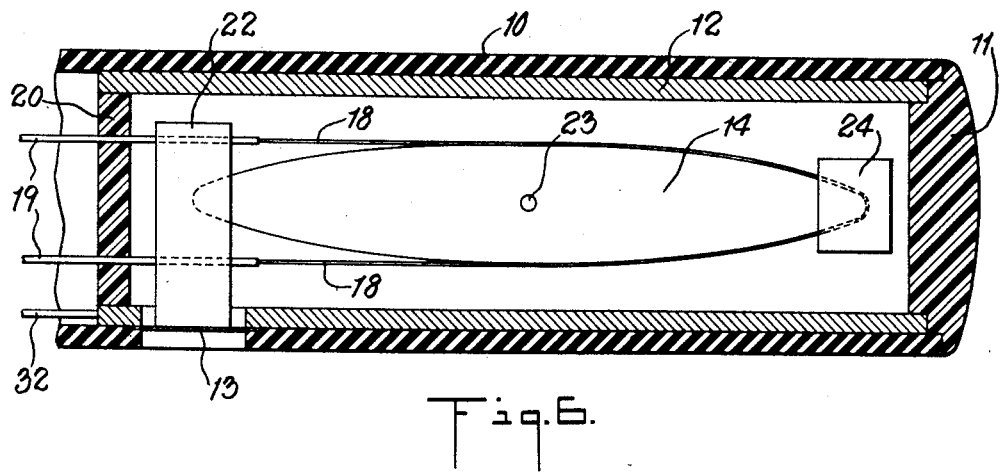
Figure 7:
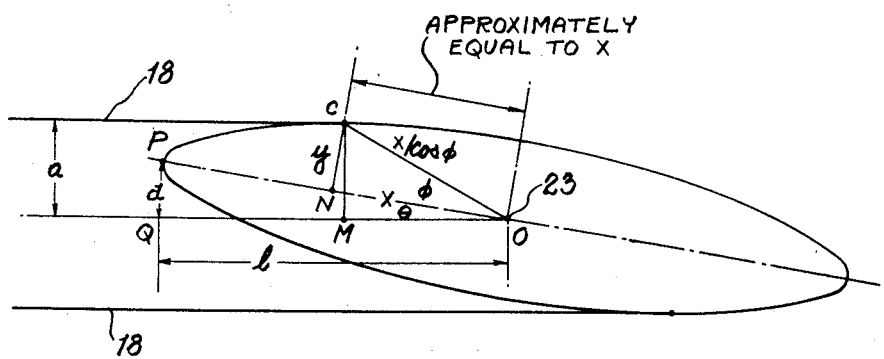

Other objects and advantages of my invention will be apparent during the course of the following description when taken in conjunction with the accompanying drawings wherein:

Figure 1 is an elevational view, partly in cross-section, of an alternative embodiment of my invention, Figure 2 is a schematic diagram of a preferred electrical circuit which may be employed in conjunction with the embodiment of Figure 1 and the other embodiments of my invention, Figure 3 is a cross-sectional view of the area surrounding the pivot of the embodiment of Figure 1, Figure 4 is a perspective view of a further embodiment of my invention, Figure 5 is a horizontal plan view of a preferred embodiment of my invention, Figure 6 is an elevational view, partly in cross-section, of the embodiment of Figure 5, and Figure 7 is a schematic drawing illustrating the theory underlying the operation of the embodiment of Figures 5 and 6.

In the drawings, wherein, for the purpose of illustration, is shown a preferred embodiment of my invention, the numeral 10 designates a catheter formed preferably of flexible natural rubber or synthetic material such as polyvinyl or polyethylene. The end of 10 is sealed by means of cap 11 which is made of epoxy resin, such as has been described in the article "Where and How to Use Epoxies" by Jerome Formo and Luther Bolstad in Modern Plastics, volume 32, No. 11, pages 99 to 104, or similar material and together with 10 serves to keep the blood from entering the interior of the catheter when it is in use. Metal shell 12 is inserted in 10 adjacent to cap 11, although it may be inserted at any convenient position along the length of 10. Diaphragm 13 is placed in an opening of 10 and 12 and is formed of polyethylene terephthalate or similar material. Pointer 15 rests on 13 and moves in response to changes in pressure thereon. The movement of 15 causes electrically conductive lever arm 14 to pivot about pivot point 16. A pivot arm is inserted in 16 and is affixed to shell 12 so that 14 moves with respect to 12 (holding means not shown).

Groove 17 is cut in the end of 14 and serves to hold bar wire 18 in place on 14. Wire 18 is insulated by covering 19 and is carried through seal 20 as shown in Figures 1 and 6. 20 is a potting compound formed of epoxy resin or similar material. In addition to groove 17, it is sometimes advisable to utilize a pair of guide bars 21 (Figure 4) which are formed of insulating material such as lightweight plastic or similar material and which serve to hold wire 18 in place and as a substitute for pointer 15.

In Figures 5 and 6, arm 14 pivots on rod 23 which is fixedly held in shell 12 by soldering, welding or similar means (not shown). Guides 24 are substituted for groove 17 and guides 22 are substituted for 15 or 21.

In Figure 2 is shown a schematic diagram of a preferred circuit to be used in connection with gauges of my invention. It is essentially a bridge circuit 25 which comprises variable arms 26 and 27 whose resistance is determined by the length of the upper and lower wires 18 from where they make contact with 14 to their respective junctions with external lead wires of low resistance (not shown). The external lead wires are connected to fixed resistors 28 and 29. An additional external lead 32 is electrically connected to the lever arm 14 by means of metal shell 12 and pivot rod 16 or 23. Battery 30 is of the order of 1 to 20 volts and supplies electric potential to the system. Variable potentiometer 31 serves to balance the bridge circuit. An indicator such as a millivoltmeter, oscilloscope or similar device is connected at the points marked "To Indicator" in Figure 2.

Wire 18 is prestressed to hold 14 in a fixed position in the absence of applied external pressure. It passes in a single half turn around 14 and is bare and uninsulated around 14 and for a small distance beyond the entire length of 14. 18 is insulated by 19 and carried through potting seal 20 and thence through 10 to the external lead wires (not shown). Bridge 25 is balanced by adjusting 31 so that with no external pressure applied, the indicator gives a zero display. Pressure amplitude and direction may be measured if a zero-center meter is used as the indicator.

The resistance of the two halves of 18 will vary depending upon the point at which each half makes contact with 14. The longer free length will have the higher resistance and the shorter free length will have the lower resistance. When a positive pressure is applied to 13, 15 moves upward and the free portion of 18 on the top side of 14 gets shorter while the free portion on the bottom of 14 gets longer. These changes in length and resistance are reflected in bridge circuit 25 and a voltage indication proportional to the applied pressure is displayed on the indicator. A negative pressure will cause 15 to move down and thereby lengthen the free portion of the upper section of 18 and shorten the lower section.

The embodiments illustrated in Figures 4 and 6 will produce results similar to that described above for the embodiment of Figure 1 when positive and negative pressures are applied so as to cause 21 and 22 to move up and down.

The sensitivity of gauges of my invention depends primarily on three factors:

(1) The shape of arm 14. The closer the top and bottom edges approach a straight line, the greater will be the sensitivity. However, if these edges are absolutely straight, the point of contact will shift in discrete amounts and will not shift in a continuous manner. Theoretically, there will be only two points of contact: the first at the left side and the second at the right side of the lever arm.

(2) The preset tension in wire 18. As the preset tension in wire 18 is increased, the sensitivity of the system is decreased. However, the tension in 18 must be sufficient to retain 14 in a relatively fixed position with respect to 12 in the absence of external pressure. If 14 is not maintained in such a relatively fixed position in the absence of external pressure, the zero stability of the system will be poor.

(3) The flexibility of 13. The more flexible 13 is, the greater the system sensitivity is.

The curve of the upper and lower edges of 14 should be parabolic to give good linearity to the gauge, as explained below. However, other shapes such as ellipses or other curves may also be used.

By way of illustration and not by way of limitation, following is a derivation of the design characteristics of the embodiment illustrated in Figures 5 and 6 along with a numerical example of the parameters for a lever arm to be used in the practice of my invention:

Referring to Figure 7, which represents the geometry of lever arm 14 of Figures 5 and 6 wherein the pointer-guide 22 has moved up a distance $d$ from its zero or rest position: The angles $\phi$ and $\theta$ and the distances $a$, $l$, $x$, $y$ and $d$ are defined by the diagram. The distance $$\frac{x}{\cos \phi}$$

is the hypotenuse of a right triangle with sides $x$ and $y$ and angle $\phi$.

From right triangle OCN:

$$y = x \tan \phi \quad (1)$$

From right triangle OCM:

$$\sin(\theta + \phi) = \frac{a}{x/\cos \phi} = \frac{a \cos \phi}{x} \quad (2)$$

From right triangle OPQ:

$$\tan \theta = \frac{d}{l} \quad (3)$$

Since the gauge is to be linear, for a change in $d$ there must be a proportional change in $x$. Let $x = kd$ (4) where $k$ is the distance multiplication factor.

Since it is also desirable for the distance between the upper and lower portions of wire 18 to remain constant, let $a$ = constant where $2a$ = minor diameter of the lever arm.

Combining (3) and (4) we get:

$$\tan \theta = \frac{x}{kl} \quad (5)$$

Expanding the left side of (2) we get:

$$\sin \theta \cos \phi + \cos \theta \sin \phi = \frac{a \cos \phi}{x} \quad (6)$$

and since $\theta$ is very small:

$\sin \theta$ is approximately $= \theta$ $\tan \theta$ is approximately $= \theta$ $\cos \theta$ is approximately $= l - \frac{\theta^2}{2}$ and then (5) becomes $$\theta = \frac{x}{kl} \quad (7)$$

$$\theta \cos \phi + \left(l - \frac{\theta^2}{2}\right) \sin \phi = \frac{a}{x} \cos \phi$$

$$\left(l - \frac{\theta^2}{2}\right) \sin \phi = \left(\frac{a}{x} - \theta\right) \cos \phi$$

$$= \frac{l}{x}(a - \theta x) \cos \phi$$

$$\tan \phi = \frac{\sin \phi}{\cos \phi} = \frac{a - \theta x}{x\left(l - \frac{\theta^2}{2}\right)}$$

Since $\theta$ is much less than $l$, $$\frac{\theta^2}{2}$$

is much less than $l$ and we have, approximately:

$$\tan \phi = \frac{a - \theta x}{x}$$

$$x \tan \phi = a - \theta x \quad (8)$$

Substituting the value of $\theta$ from (7) in (8) and noting from (1) that $y = x \tan \theta$, we get:

$$y = a - \frac{x}{kl}x = a - \frac{x^2}{kl} \quad (9)$$

This is the equation of a parabola which is symmetrical about the $y$—axis and has a $y$ intercept $= a$ and $x$ intercepts $= \pm (kla)^{1/2}$.

To design a lever arm of my invention, the following steps are followed:

(1) Choose the desired values of $a$ and $l$.
(2) Choose the desired value for the distance multiplication factor $k$.
(3) Divide $l$ into equal intervals and denote the points dividing the intervals by $x_1$, $x_2$, $x_3$, etc.
(4) Compute the corresponding values of $y_1$, $y_2$, $y_3$, etc. from (9).
(5) The lever arm widths will then be $2y_1$, $2y_2$, $2y_3$, etc.
(6) The ends of the lever arms are rounded to make the path of wire 18 smooth.

For example, a suitable catheter gauge of my invention has the following dimensions:

(1) Let $a = .010''$ and $l = .400''$
(2) Let $k = 100$ inches per inch
(3) Let $x_0 = .00$ inches
$\quad x_1 = .05$ inches
$\quad x_2 = .10$ inches
$\quad x_3 = .15$ inches
$\quad x_4 = .20$ inches
$\quad x_5 = .25$ inches
$\quad x_6 = .30$ inches
$\quad x_7 = .35$ inches Then (4) $\quad y = .010 - \frac{x^2}{100(.4)} = .01000 - .025x^2$ and therefore $y_0 = .0100$ inches
$y_1 = .00994$ inches
$y_2 = .00975$ inches
$y_3 = .00944$ inches
$y_4 = .00900$ inches
$y_5 = .00844$ inches
$y_6 = .00775$ inches
$y_7 = .00694$ inches (5) the dimensions of the lever arm are:

| Distance measured from Center along the Major Axis ($x$) | Width ($2y$) |
|---|---|
| Inches | Inches |
| .00 | .02000 |
| .05 | .01998 |
| .10 | .01950 |
| .15 | .01888 |
| .20 | .01800 |
| .25 | .01688 |
| .30 | .01550 |
| .35 | .01398 |

It can readily be seen that similar designs and examples may also be developed for lever arms with other curves for their upper and lower edges. However, the closest approximation to linearity is achieved when the lever arms are formed with parabolic upper and lower edges.

While I have described my invention by means of specific examples and in specific embodiments, I do not wish to be limited thereto, for obvious modifications will occur to those skilled in the art without departing from the spirit of my invention or the scope of the subjoined claims.

Having thus described my invention, I claim:

1. A pressure gauge comprising a housing; within said housing a thin symmetrical, electrically conductive arm, said arm being pivoted and movable with respect to said housing; means for moving said arm with respect to said housing; conducting means placed under tension in a single loop around the periphery of said arm such that the contact between said conducting means and said arm varies in accordance with the position of said arm; and means for making external electrical connection to said conducting means.

2. A pressure gauge as described in claim 1 including placing said gauge in a catheter carrying a window diaphragm and wherein external pressure upon said window acts on said means for moving said arm.

3. A pressure gauge as described in claim 2 wherein said means for moving said arm is a pointer affixed to one end of said arm, one end of said pointer being in contact with said window diaphragm.

4. A pressure gauge as described in claim 1 including means for holding said conducting means in contact with said arm.

5. A pressure gauge as described in claim 4 wherein said means for holding said conducting means in contact with said arm is a groove in the end of said arm around which said conducting means is looped.

6. A pressure gauge as described in claim 4 wherein said means for holding said conducting means in contact with said arm is a pair of guides affixed on said arm.

7. A pressure gauge as described in claim 1 wherein the long dimensions of said arm are sections of symmetrical parabolas.

References Cited in the file of this patent

UNITED STATES PATENTS 1,313,853     Bentley  ---------------  Aug. 19, 1919